United States Patent [19]

Goeke et al.

[11] 4,269,742

[45] May 26, 1981

[54] EPOXY RESIN HARDENING AGENTS FROM MANNICH BASES AND METHOD FOR CURING

[75] Inventors: Ulrich Goeke, Luenen; Michael Richter, Unna, both of Fed. Rep. of Germany

[73] Assignee: Schering Aktiengesellschaft, Berlin and Bergkamen, Fed. Rep. of Germany

[21] Appl. No.: 99,977

[22] Filed: Dec. 3, 1979

Related U.S. Application Data

[63] Continuation-in-part of Ser. No. 7,834, Jan. 30, 1979, abandoned.

[30] Foreign Application Priority Data

Feb. 11, 1978 [DE] Fed. Rep. of Germany ....... 2805853
May 31, 1978 [DE] Fed. Rep. of Germany ....... 2823682

[51] Int. Cl.$^3$ .................... C08G 59/50; C08G 59/54
[52] U.S. Cl. .................... 260/18 PN; 260/18 EP; 260/19 EP; 528/96; 528/98; 528/99; 525/507
[58] Field of Search ......... 260/18 PN, 19 EP, 18 EP; 528/96, 98, 99; 525/507

[56] References Cited

U.S. PATENT DOCUMENTS

| 3,002,941 | 10/1961 | Peterson | 260/18 |
| 3,390,124 | 6/1968 | Kittridge et al. | 260/47 |
| 3,870,666 | 3/1975 | Becker | 260/21 |
| 4,129,556 | 12/1978 | Zondler et al. | 528/97 |

*Primary Examiner*—Earl A. Nielsen
*Attorney, Agent, or Firm*—Curtis, Morris & Safford

[57] ABSTRACT

Amine compounds, adaptable to use as a hardener for epoxy compounds, prepared by the reaction, with amine exchange and liberation of secondary amine, of a Mannich base and a member selected from the group consisting of aminoamides, aminoimidazolines, aminoamides containing an imidazoline group, and polyamines, said Mannich base being prepared by reacting formaldehyde, a monophenol or polyphenol, and a secondary amine are disclosed, as are a method of making epoxy polyadducts (i.e. cured epoxy resins) by the reaction of said amine hardener compounds with an epoxy compound and the epoxy polyadducts (i.e. cured epoxy resins) so prepared.

17 Claims, No Drawings

EPOXY RESIN HARDENING AGENTS FROM MANNICH BASES AND METHOD FOR CURING

This application is a continuation-in-part of application Ser. No. 7,834 filed Jan. 30, 1979, and now abandoned.

The present invention relates to certain hardening agents which are modified accelerated aminoamides, aminoimidazolines, imidazole-containing aminoamides, and polyamides, to a method for making epoxide polyadducts therewith, and to the polyadducts so made.

The hardeners in accordance with the invention make it possible to produce films which harden tack-free at low temperatures.

The hardeners in accordance with the invention are characterized by a relatively long pot life and relatively short hardening time.

Accelerated polyamines are customarily used as low-temperature hardeners for epoxy resins. For their production, phenol or other aromatic hydroxy compounds, polyamine, and formaldehyde are used, with the splitting-off of water.

The reaction does not take place very selectively. Depending on the selected molar ratio of the components, 15 to 30 percent of unreacted phenol is still present in the hardeners produced in this manner. During the amine-epoxide reaction, the free phenol is not incorporated into the lattice and is present in the form of an extractable component. In general view, products which contain more than 5 percent of phenol are considered toxic and must be declared as such.

As hardeners for epoxy resins, polyaminoamides have the advantage that the films obtained are of hard elasticity, that the mixing ratio with epoxy resins is not critical, and that they are less toxic and less volatile than polyamines. One disadvantage of aminoamide hardeners is that at low temperatures (<10° C.) only incomplete curing takes place and that, in case of high relative atmospheric humidity, tacky surfaces and cloudy films are formed.

The object of the present invention is to overcome these drawbacks and to find an agent, as well as a process, which permits the tack-free curing of glycidyl compounds a low temperatures and high relative humidities and which does not contain any free phenol.

According to the present invention, this object is achieved by preparing epoxy polyadducts, i.e. cured epoxy resins, using hardening agents which are the reaction products of (B) Mannich bases (prepared from phenols, secondary monoamines, and formaldehyde) with (A) aminoamides, aminoimidazolines, imidazoline-containing aminoamides, and/or polyamines, with amine exchange and the splitting-off of secondary amine. The hardening agents of the present invention all contain an average of more than two reactive amine hydrogen atoms per molecule. This, together with the fact that the hardeners are liquid, and hence readily miscible with the epoxy compounds which they are used to harden, permits the curing of said epoxy compounds in a single step to form cross-linked epoxy resins (i.e. duroplasts) at temperatures as low as room temperature (20° C.), and even as low as about 5° C. or 10° C.

For example, resins can be cured according to the present invention at 20° C. in at most about 6 hours, at 10° C. in at most about 12 hours and at 5° C. in at most about 24 hours. After these cure times, the resins are sufficiently hardened that they can be mechanically loaded, for example walked upon or driven upon.

As aminoamides, aminoimidazolines, and aminoamides containing imidazole groups (component A), the compounds known in the prior art as hardening agents for epoxy compounds are suitable. Such as known, for instance, from German Pat. Nos. 972 757 and 1 074 856, German Provisional Patents (DE-AS) Nos. 1 041 246, 1 089 544, 1 106 495, 1 295 869 and 1 250 918, from British Pat. Nos. 803,517, 810 348, 873 224, and 865 656 and 956 709, Belgian Pat. No. 593 299, French Pat. No. 1 264 244, and from U.S. Pat. Nos. 2,705,223, 2,712,001, 2,881,194, 2,966,478, 3,002,941, 3,062,773 and 3,188,566, all incorporated herein by reference.

Advantageous for use as component A in the method of the invention are those aminoamides, aminoimidazolines, and aminoamides containing imidazoline groups which are prepared by reacting polyamines, at a ratio of amino groups: carboxy groups of >1, with a carboxylic acid component comprising (a1) monocarboxylic acids, such as straight-chain or branched alkyl carboxylic acids having 2 to 22 carbon atoms, particularly those having 2 to 4 and 16 to 22 carbon atoms, and preferably 18 carbon atoms, such as acetic acid, propionic acid, butyric acid, caproic acid, caprylic acid, capric acid, lauric acid, myristic acid, and also, in particular, the natural fatty acids such as stearic, oleic, linoleic, linolenic, and tall oil fatty acid; or (a2) the so-called dimeric fatty acids obtainable by the polymerization of unsaturated natural and synthetic monobasic aliphatic fatty acids having 12 to 22 carbon atoms, and particularly 18 carbon atoms, in accordance with known methods [see, for instance, German Unexamined Applications for Patent (DE-OS) Nos. 1 443 938 and 1 443 968, German Pat. No. 2 118 702, 1 280 852, all incorporated herein by reference.] Typical polymerized fatty acids which are commercially obtainable have the following approximate composition:
monomeric acids: 5–15% by weight
dimeric acids: 60–80% by weight
trimeric and higher-functional acids: 10–35% by weight However, it is also possible to use fatty acids whose trimeric and higher-functional content or whose dimeric portion has been enriched by suitable distillation methods, or fatty acids which have been dehydrogenated by known methods; or (a3) carboxylic acids obtained by copolymerization from unsaturated higher fatty acids having 16 to 22, and particularly 18, carbon atoms, or from their esters with aromatic vinyl compounds, (cf. British Pat. No. 803 517); or (a4) adducts of unsaturated higher fatty acids or fatty acid esters with unsaturated lower monocarboxylic or dicarboxylic acids or anhydrides such as fumaric acid, maleic acid, maleic acid anhydride, or acrylic acid (cf. DE-AS Nos. 1 295 829, 1 420 761, and 1 272 918); or (a5) acids prepared by the reaction of unsaturated fatty acids, carbon monoxide and eater (cf. Reppe and Kroper, Ann., 582, 63–65 (1953) and German Pat. No. 1 006 849); or (a6) epoxidized unsaturated higher fatty acids (cf. DE-AS No. 1 041 246); or (a7) aliphatic, hydroaromatic (cycloaliphatic), araliphatic, and aromatic di- and polycarboxylic acids having 6 to 36 carbon atoms, and particularly 6 to 14 carbon atoms, preferably acids of hydrocarbons, such as the homologous series of the saturated aliphatic hydrocarbon dicarboxylic acids, particularly adipic acid, azeleic acid, or sebacic acid, as well as decamethylene dicarboxylic acid and brassylic acid, or trimethyladipic acid (DE-OS No. 1 745 452), or the $C_{36}$ dicarboxylic acid described in U.S. Pat. No. 3,993,661, or, as an hydroaromatic dicarboxylic acid, 1,4-cyclohexane dicarboxylic acid, or as an araliphatic dicarboxylic acid, phenylene diacetic acid, or as aromatic dicarboxylic acids, terephthalic acids and isophthalic acid; or (a8) acids prepared by the addition of phenol or its substitution products to unsaturated monocarboxylic acids (cf. DE-OS No. 1 543 754), such as hydroxyphenylstearic acid or 2,2-bis-(hydroxyphenyl)-valeric acid, or addition products of phenol to polycarboxylic acids such as dimeric fatty acid (for instance U.S. Pat. No. 3,468,920); or (a9) amino acids, or lactams such as ε-aminocaproic acid or laurin lactam (for instance see DE-AS No. 1 694 958).

In general, the acids of the above-indicated groups are used individually for the condensation with the polyamines, but mixtures can also be employed. Of particular importance in industry are the polyaminoamides and polyaminoimidazolines of the monomeric or polymeric fatty acids described under (a1) and (a2), which are therefore preferred for use in the method of the invention.

As amine components used according to the invention for the preparation of component A, polyamines are used such as:

(aa1) polyethylene polyamines, such as diethylene triamine, triethylene tetramine, and tetraethylene pentamine (cf. DE-OS No. 1 543 754); or (aa2) polypropylene polyamine, as well as the polyamines obtained by cyanethylation of polyamines, particularly of ethylenediamine, followed by hydrogenation (cf. prospectus of BASF AG. 1976); or (aa3) aliphatic polyamines, particularly of aliphatic hydrocarbons, such as diaminoethane, diaminopropane, diaminobutane, diaminohexane, 3,3,5(3,5,5)-trimethyl-1,6-diaminohexane; or (aa4) cycloaliphatic polyamines, particularly of cycloaliphatic hydrocarbons, such as 1-amino-3-aminomethyl-3,5,5-trimethyl-cyclohexane (isophorone diamine) or 1,4-diaminocyclohexane (cf. DE-AS No. 1 694 958); or (aa5) heterocyclic polyamines such as N-aminoethylpiperazine; or (aa6) polyetheramines, prepared by the cyanethylation of alkanols having at least 2 hydroxyl groups followed by hydrogenation, such as 1,12-diamino-4,8-dioxadodecane; or mixtures of two or more of the amines indicated under (aa1) to (aa6). According to the invention, the polyamines indicated under (aa1) and (aa2) are particularly preferred.

Also suitable according to the invention for use as aminoamides or aminoamides containing imidazoline groups (component A) are the adducts of such compounds with glycidyl compounds, such as are known, for instance, from DE-AS Nos. 1 494 524 and 1 520 918, and from U.S. Pat. No. 2,970,971.

Polyamines used as component A in accordance with the invention for amine exchange with Mannich bases (component B) are those such as:

(a10) polyethylene polyamines, such as diethylene triamine, triethylene tetramine, or tetraethylene pentamine (cf. DE-OS No. 1 543 754); or (a11) polypropylene polyamine, as well as the polyamines obtained by cyanethylation of polyamines, particularly of ethylenediamine, followed by hydrogenation (cf. prospectus of BASF 1976); or (a12) aliphatic polyamines, particularly of aliphatic hydrocarbons, such as diaminoethane, diaminopropane, neopentanediamine, diaminobutane, diamino hexane, and 3,3,5(3,5,5)-trimethyl-1,6-diaminohexane; or (a13) cycloaliphatic polyamines, particularly of cycloaliphatic hydrocarbons, such as 1-amino-3-aminomethyl-3,5,5-trimethyl-cyclohexane (isophorone diamine) and 1,4-diaminocyclohexane (cf. DE-AS No. 1 694 958); or (a14) heterocyclic polyamines, such as N-aminomethylpiperazine; or (a15) polyetheramines, such as 1,12-diamino-4,8-dioxadodecane and/or polyether polyamines of the general formula

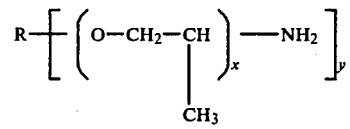

wherein x is >2, and particularly 2 to 20, y is 2, 3 or 4, and R is a hydrocarbon group having a valence corresponding to y: or (a16) aromatic amines; or mixtures of two or more of the amines indicated under (a10) to (a16). The polyamines indicated under (a10) and (a11) are preferred according to the invention.

In each case, the amount of component (A), of whatever type, reacted with Mannich base component (B) is such that the reaction product contains an average of more than two active amine hydrogen atoms per molecule.

The amine-exchange reaction takes place if the Mannich base (component B) and aminoamide or polyamine (component A) are heated, with agitation, to temperatures of 100° C. and preferably of 130° C. to 180° C., optionally with the simultaneous use of an inert solvent. The secondary amine which is liberated within 0.5 to 3 hours is distilled into a cooled receiver. As shown by gas chromatographic analysis, the amine which distills off is so pure that it can be used again without further treatment for the preparation of the initial Mannich base.

The secondary amine must be so selected that its boiling point differs sufficiently from the boiling point of the polyamine used. If the reaction temperature lies above the boiling point of the polyamine, the reaction vessel must be provided with a sufficiently effective fractionating column to avoid losses of polyamine.

As Mannich bases, within the meaning of the present invention, are to be understood the reaction products of phenols, formaldehyde, and secondary monoamines. As phenols, use may be made of monophenols such as phenol, ortho-, meta- or para-cresol, the isomeric xylenols, para-tertiary-butylphenol, para-nonylphenol, α-naphthol, and β-naphthol, as well as di- and poly-phenols such as resorcinol, hydroquinone, 4,4'-dioxydiphenyl, 4,4'-dioxydiphenylether, 4,4'-dioxydiphenylsulfone, 4,4'-dioxydiphenylmethane, and bisphenol A as well as the condensation products of phenol and formaldehyde known as novolaks.

As secondary amines, use may be made of dimethylamine, diethylamine, dipropylamine, dibutylamine, piperidine, pyrolidine, morpholine, and methylpiperazine.

A comprehensive enumeration of the phenols and amines which can be employed can be found in M. Tramatini, Syntheses 1973, page 703, incorporated herein by reference. With respect to the preparation of the Mannich bases, reference is also made to this book.

The molar amounts of formaldehyde and amine used per mol of the phenol employed depend on the number of substitutable groups in the phenol. In phenol itself it is 3, in bisphenol A 4, and in para-tertiarybutylphenol 2, for example.

The Mannich bases which are preferred for the present invention are the reaction products of phenol or of bisphenol A with formaldehyde and dimethylamine, having 1 to 4 tertiary amine groups.

If novolaks are used as the phenolic component, Mannich bases having up to 10 and more secondary amine groups are obtained.

Upon reaction of the Mannich bases with aminoamides and/or polyamines, all tertiary amino groups of the Mannich bases can be exchanged. Nevertheless, those hardening agents used according to the invention which comprise polyaminoamides, aminoimidazolines, and imidazoline-containing polyaminoamides still containing at least one tertiary amino group in the molecule are preferred.

The hardeners according to the invention can be used to particular advantage when it is necessary to operate at low temperatures and under high relative humidity. This is particularly the case for outside uses in the field of coatings and construction, where temperatures around 5° C. and relatively humidities of 95% must be expected.

Further fields in which the hardening agents of the invention can be advantageously used for the production of epoxy polyadducts are in the areas of casting resins, of adhesives, and in the manufacture of laminates.

The low-temperature hardeners comprising phenol, polyamine, and aldehyde which have heretofore been known have the disadvantage that they have very short working times when mixed with ordinary epoxy resins comprising bisphenol A. As a result, the possibilities of using them for the production of solvent-free coatings is limited. A one-component application by hand with brush or roller is difficult. One surprising advantage of the hardeners of the present invention is that, with a rate of hardening comparable to that of conventional Mannich bases, they have a definitely longer working time. In this way the possibilities for using them in the field of coatings are considerably improved.

Another advantage resides in the absence of phenol from the hardeners of the invention. From toxicological standpoints this advantage is particularly valuable in view of the toxicity of phenol.

Not only do handling and transportation become less dangerous. A larger or smaller quantity of phenol can be extracted with water, depending on its temperature and time of action, from duroplasts which are prepared with conventional phenol-containing low-temperature hardeners. The use of such products in connection with drinking water or with foodstuffs is therefore not indicated. On the other hand, the duroplast products of the invention can be advantageously used in the drinking water and foodstuff sectors.

The effect obtainable with the hardeners of the invention, in turn based on their inner acceleration, was not forseeable, since no improvement in the direction of the observed effect found can be obtained using mere physical mixtures of the individual components.

The glycidyl compounds which are concurrently used in accordance with the invention are ordinary commercially available products having more than one epoxy group per molecule, which are derived from monovalent and polyvalent single and multiple-ring phenols, particularly bisphenols, as well as novolaks. A comprehensive enumeration of these bi- or polyphenols is to be found in the manual "Epoxidverbindungen und Epoxidharze" (Epoxy Compounds and Epoxy Resins), by A. M. Pacquin, published by Springer Verlag, Berlin 1958, Chapter IV, and Lee and Neville "Handbook of Epoxy Resins," 1967, Chapter 2, both incorporated herein by reference.

Mixtures of two or more of the epoxy resins with each other can also be employed. Glycidyl compounds comprising bisphenol A (4,4-dihydroxy-diphenylpropane-2,2) and having epoxy values of 0.4 to 0.55 are preferred.

Mixtures of the glycidyl compounds with so-called reactive diluents, such as monoglycidylethers of phenols, can also be used. These reactive diluents serve primarily to reduce the viscosity and, since they unfavorably affect the final properties of the duroplasts, should be used only in small quantities.

The glycidyl compounds mentioned by way of example can be used both for the hardenable combinations as well as for the production of hardener-epoxide adducts, mentioned earlier herein, which can be used in the process of the invention.

Hardening agents and glycidyl compounds are used in the process of the invention preferably in approximately equivalent quantities, i.e. referred to active amine hydrogen atoms and reactive epoxy groups. However, it is also possible to use hardening agents of glycidyl components in excess or in deficiency. The specific quantities depend on the final properties desired for the reaction product. Ordinary catalytic or reactive hardeners for epoxy resins can be concurrently employed in the method of the invention. A comprehensive enumeration of these ordinary hardeners to be found in the manual, "Handbook of Epoxy Resins" by Lee and Neville, 1967, Chapters 7 to 10, incorporated herein by reference. The hardeners discussed earlier herein with reference to certain German, British, Belgian, French, and U.S. patents, also are incorporated herein by reference are particularly preferred.

As a rule, the hardeners of the invention and the customary hardeners, in the desired ratio, are added to the epoxy compound separately or as a mixture.

However, when preparing the hardener according to the invention, the ratio of the components participating in the reaction can also be so selected that there is present in the reaction mixture, in addition to the hardener of the invention, also the component which is to act as cohardener.

The particular advantage of the hardening agents of the invention resides in their excellent hardening behavior at temperatures of about 5° C. and at high relative humidities of about 95%. This does not exclude their use at room temperature or at elevated temperatures, alone or with the concurrent use of hardeners customary in this field, particularly the amine or aminoamide hardeners.

Depending on the field and purpose of use, inorganic and/or organic additives such as fine sands, talc, silica, alumina, metals or metal compounds in chip and powder form, thixotroping agents, fibrous materials such as asbestos and glass staple fibers, pigments, flame retardants, solvents, dyestuffs, plasticizers, bitumen, and mineral oils may be added to the epoxy resin/hardening-agent mixtures of the invention.

A better understanding of the present invention and of its many advantages will be had by referring to the following examples, given by way of illustration.

EXAMPLE 1

400 g of an imidazoline-containing aminoamide having an amide number of 375, prepared from monomeric fatty acid (natural, C-18, tall oil fatty acid) and triethylene tetramine, are heated to 145° C. together with 265 g (1 mol) of tri(dimethylaminomethyl) phenol (hereinafter called DMP 30). After 90 minutes, 45 g (1 mol) of dimethylamine have split off. The reaction is interrupted. A product having the following properties is obtained:
amine number: 323
viscosity 25° C.: 8.1 Pa.s

EXAMPLE 2

240 g of the aminoamide of Example 1 having an amine number of 375 are heated with 80 g (0.3 mol) of DMP 30 to about 145° C. After 27 g (0.6 mol) of dimethylamine have split off (about 40 minutes), the reaction is interrupted. The resultant product has the following properties:
amine number: 344
viscosity 25° C.: 11.2 Pa.s

EXAMPLE 3

240 g of the aminoamide of Example 1 are reacted with 53 g (0.2 mol) of DMP 30. After 2 hours, 27 g (0.6 mol) of dimethylamine have split off. The resultant product has the following properties:
amine number: 385
viscosity 25° C.: 22.9 Pa.s

EXAMPLE 4

200 g of an aminoamide having an amine number of 385 and prepared from dimeric tall oil fatty acid and triethylene tetramine are heated to 140° C. with 37 g (0.14 mol) of DMP 30. After 20 minutes, 10 g of dimethylamine (0.22 mol) have split off and the reaction is interrupted. The resultant product has the properties:
amine number: 372
viscosity 74° C.: 14.4 Pa.s

EXAMPLE 5

200 g of an aminoamide having an amine number of 460, prepared from $C_8$–$C_{10}$ monocarboxylic acid and tetraethylenepentamine, are heated for about 30 minutes with 132 g (0.5 mol) of DMP 30 at 140° C. After 23 g (0.5 mol) of dimethylamine having distilled off, the reaction is interrupted. The resultant product has the following properties:
amine number: 418
viscosity 25° C. 62.4 Pa. s

EXAMPLE 6

180 g of a commercially available aminoamide comprising an acid obtained by reacting styrene and natural, C 18, soya oil fatty acid and triethylenetetramine and having an amine number of 425 are heated with 133 g (0.5 mol) of DMP 30° to 145° C. After 15 minutes, 23 g (0.5 mol) of dimethylamine have split off. The reaction is interrupted.

The resultant product has the following analytical values:
amine number: 429
viscosity 25° C.: 99.4 Pa. s

EXAMPLE 7

138 g of an aminoamide, free of imidazoline groups and for between ε-aminocaproic acid and trimethylhexamethylenediamine and having an amine number of 363 and a viscosity of 1.55 Pa. s/25° C. were reacted with 26.5 g (0.1 mol) of DMP 30. At 140° C., 4.5 g (0.1 mol) of dimethylamine split off within about 20 minutes. The reaction is interrupted. The resultant product has the following analytical values:
amine number: 371
viscosity 25° C.: 11.6 Pa. s

EXAMPLE 8

88 g (0.52 mol) of an imidazoline of the formula

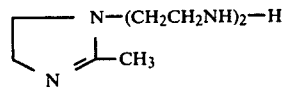

were heated to 140° C. with 92 g (0.35 mol) of DMP 30. Within 15 minutes, 15.6 g (0.235 mol) of dimethylamine split off. Upon cooling a resin of medium viscosity is obtained.
amine number: 618
viscosity 75° C.: 1.1 Pa. s

EXAMPLE 9

40 g of an aminoamide comprising monomeric, natural, C 18, tall oil fatty acid and triethylene tetramine and having an amine number of 375 are heated to 150° C. with 46 g (0.1 mol) of tetra-(dimethylaminomethyl) bisphenol A. Within 20 minutes, 4.5 g (0.1 mol) of dimethylamine are split off. The resultant product has the following analytical values.
amine number: 375
viscosity 75° C.: 14.9 Pa. s

EXAMPLE 10

200 g of the aminoamide of Example 9 are reacted with 167 (0.5 mol) of bis-(dimethylaminomethyl)-nonylphenol at 150°–170° C. After one hour, 19 g (0.42 mol) of dimethylamine have split off. The reaction is interrupted. The resultant product has the following analytical values:
amine number: 263
viscosity 25° C.: 4.1 Pa. s

EXAMPLE 11

220 g of an aminoamide comprising $C_{18}$ monocarboxylic soya oil fatty acid, tetraethylenepentamine, and a polypropylenepolyamine mixture comprising 65 percent by weight of N-(aminopropyl)ethylenediamine and 35 percent by weight of N,N-di(aminopropyl) ethylenediamine and having an amine number of 375 are heated with 132 g (0.5 mol) of DMP 30 until 24 g (0.53 mol) of dimethylamine have split off. After cooling, a product is obtained having:
amine number: 397
viscosity 25° C.: 33.8 Pa. s

EXAMPLE 12

An aminoamide having an amine number of 522 was prepared from triethylenetetramine and a dicarboxylic acid having an acid number of 90, which in turn was obtained by the addition of acrylic acid to unsaturated isomerized linoleic acid having conjugated double bonds. 160 g of this aminoamide and 36 g (0.13 mol) of DMP 30 are heated to about 140° C. Within the course of 30 minutes, 6 g (0.13 mol) of dimethylamine distill off. The product has the following properties:
amine number: 500
viscosity 25° C.: 480 Pa. s

EXAMPLE 13

186 g of a product obtained according to Example 1 were reacted with 14 g of phenylglycidylether to form an aminoamide adduct.
amine number: 360
viscosity 25° C.: 12.9 Pa. s

EXAMPLE 14

186 g of a product obtained according to Example 1 are reacted with 17 g of dianresin comprising bisphenol A and having an epoxy equivalent weight of 190 to form an adduct.
amine number: 350
viscosity: 94.3 Pa. s

EXAMPLE 15

By mixing 42.5 parts by weight of the product obtained according to Example 1, 42.5 parts by weight of a conventional aminoamide hardener prepared from dimerized fatty acid and triethylenetetramine and having an amine number of 390, and 15 parts by weight of benzyl alcohol (diluent), a hardener having an amine number of 300 and a viscosity of 3.4 Pa. s/25° C. is obtained. The dimerized fatty acid used in preparing the conventional hardener, here combined with the hardener of Example 1 (i.e. prepared according to the invention), is derived from soya oil fatty acid and comprises about 12 percent by weight of monomeric acid, 76.3 percent by weight of dimeric acid, and 12.5 percent by weight of tri- and higher polymers.

100 g of this hardener are mixed with 100 g of an epoxy resin comprising bisphenol A and having an epoxy equivalent weight of 190 and the mixture is applied to a substrate as a thin film.

The following properties are obtained upon hardening at:
(1) Room temperature
  Flow: good
  Tackiness after 1 day: tack-free
  Appearance: Gloss
  Buchholz hardness after 1 day*: 100
  Buchholz hardness after 7 days: 100
  Erichsen impression after 7 days**: 7
*According to DIN 53153
**According to DIN 53156
(2) A temperature of 5° C.
  Buchholz hardness after 1 day: 35
  Buchholz hardness after 7 days: 83

The film is resistant to water, 10% caustic soda solution, and toluene, and is not resistant to methanol, ethanol, and 5% acetic acid.

EXAMPLE 16

398 g (1.5 mol) of DMP 30 and 270 g (4.5 mol) of ethylenediamine are heated to 120° C. Boiling ethylenediamine is condensed with a fractionating column heated to 50° C.; dimethylamine is frozen cut in a cold trap. After 196 g (97% of the theoretical yield) of dimethylamine have been split off (after 5 hours), the reaction is interrupted. The residue has the following analytical values: amine number=990, viscosity at 25° C.=30 Pa. s.

EXAMPLE 17

87 g (0.33 mol) of DMP 30 and 204 g (1 mol) of bis-(aminopropoxy)butane are heated for 2 hours to 140°–180° C. After the splitting-off of 43 g (96% of the theoretical yield) of dimethylamine, a product having an amine number of 440 and a viscosity at 25° C. of 3.5 Pa. s is obtained.

EXAMPLE 18

265 g (1 mol) of DMP 30 and 387 g (3 mol) of N-aminoethylpiperazine are heated for 2 hours at 130° C.–160° C. After the splitting-off of 135 g (100% of the theoretical yield) of dimethylamine, a product which is highly viscous at room temperature and has an amine number of 645 is obtained.

EXAMPLE 19

528 g (2.5 mols) of bis-(dimethylaminomethyl)phenol are heated with 480 g (8.0 mol) of ethylenediamine to a maximum of 130° C. 336 g of distillate are collected. Thereafter, excess ethylenediamine is removed at 70° C./3 mm. A product having an amine number of 780 and a viscosity of 8.7 Pa. s at 25° C. remains.

EXAMPLE 20

105 g (0.5 mol) of bis-(dimethylaminomethyl)phenol are heated with 131 g (1 mol) of dipropylenetriamine to 180° C. within 2 hours. 44 g (98% of the theoretical yield) od dimethylamine are collected in a cold trap. The product obtained has an amine number of 865 and a viscosity of 3.3 Pa. s at 25° C.

EXAMPLE 21

136 g (1 mol) of xylylenediamine and 105 g (0.5 mol) of bis(dimethylaminomethyl)phenol are heated for 1 hour at 155° C. until 44 g (98% of the theoretical yield of dimethylamine have distilled off. The resultant product has an amine number of 560 and a viscosity of 160 Pa. s at 25° C.

EXAMPLE 22

137 g of a mixture of aminopropylethylenediamine and bis-(aminopropyl)ethylenediamine are reacted in accordance with the preceding examples with 105 g of bis-(dimethylaminomethyl)phenol until 41 g (91% of the theoretical yield) of dimethylamine are liberated. The product has an amine number of 940 and a viscosity of 3.8 Pa. s at 25° C.

EXAMPLE 23

174 g (1.5 mol) of hexamethylenediamine and 212 g (1 mol) of bis-(dimethylaminomethyl)phenol are heated for 40 minutes at 140°–160° C. After 67 g of dimethylamine (75% of the theoretical yield) have split off, the reaction is interrupted. The resultant product has a viscosity of 3.0 Pa. s at 25° C. and an amine number of 615.

EXAMPLE 24

306 g (1.5 mol) of 1,4-bis(aminopropoxyl)butane and 265 g (1 mol) of DMP 30 are reacted at 170° C. until (45 minutes) 67 g (50% of the theoretical yield) of dimethylamine have been split off. The product which is obtained after interruption of the reaction has an amine number of 460 and a viscosity of 2.7 Pa. s at 25° C.

EXAMPLE 25

180 g of an equimolar mixture of dimethylaminomethylphenol and bis-(dimethylaminomethyl)phenol are heated with 197 g (1.5 mol) of dipropylenediamine to a maximum of 130° C. Within 2 hours, 67 g (100% of the theoretical yield) of dimethylamine have split off. The resultant product has an amine number of 811 and a viscosity of 1.5 Pa. s at 25° C.

EXAMPLE 26

260 g of an aminoamide described in more detail below are heated with 105 g (0.5 mol) of bis(dimethylaminomethyl) phenol for about 30 minutes at about 140° C. until 34 g (75% of theory) of dimethylamine are split off. The aminoamide comprises, as the acid component, an epoxidized soya oil fatty acid methyl ester/C-18 fatty acid having an iodine number of 150. The amine component is tetraethylenepentamine/1,12-diamino-4,9-dioxadodecane having an amine number of 550. The resin obtained is one of average viscosity having an amine number of 493 and a viscosity, at 25° C. of 7.8 Pa. s.

ened with the hardeners of the present invention with samples hardened with conventional Mannich bases alone.

The pot life reported in the Table is a Tecam value (drop time) determined as follows: a glycidyl compound comprising bisphenol A and having an epoxy equivalent weight of 190 and the hardener are heated separately to 23° C. and then mixed in stoichiometric quantities. The Tecam open time is determined at 23° C. for 110 g of this mixture.

Following Table II reports curing behavior for a number of the hardeners earlier disclosed when used to cure an epoxy resin having an epoxy-equivalent weight of 190.

TABLE I

|  | Phenol content (percent) | Pot Life (minutes) | Buchholz hardness after 1 day at 5° C./ 95% relative humidity |
|---|---|---|---|
| Hardener of Example 16 | 0 | 30 | about 30 |
| Comparison hardener A | 5 | 27 | not measurable |
| Hardener of Example 19 | <1 | 35 | about 30 |
| Comparison hardener B | 19 | 22 | not measurable |
| Hardener of Example 25 | 3 | 32 | about 30 |
| Comparison hardener C | 19 | 17 | 50 |

Comparison hardener A is prepared from 1 mol of phenol, 3 mols of ethylene diamine, and 3 mols of formaldehyde.
Comparison hardener B is prepared from 1 mol of phenol, 2 mols of ethylene diamine, and 2 mols of formaldehyde.
Comparison hardener C is prepared from 1 mol of phenol, 1 mol of dipropylenetriamine and 1 mol of formaldehyde.

TABLE II

| Hardener (Ex. No.) | pbw/ 100g resin | Curing at Room Temperature (20° C.) | | | | Curing at 5° C. (45% humidity) | | | |
|---|---|---|---|---|---|---|---|---|---|
| | | Flow | Tackiness (after 1 day) | Appearance | Buchholz Hardness (after 1 day) | Flow | Tackiness (after 1 day) | Hardness (after 1 day) | Buchholz Hardness (after 1 day) |
| 1 | 120 | good | tack free | glossy | | good | tack free | | 62 |
| 4 | 62 | good | tack free | glossy | | good | tack free | | 90 |
| 5 | 118 | good | tack free | glossy | | good | tack free | | 67 |
| 6 | 102 | good | tack free | glossy | | good | tack free | | 100 |
| 9 | 142 | good | tack free | glossy | | good | tack free | | 110 |
| 13 | 129 | | | | | | tack free | | 67 |
| 17 | 44 | good | tack free | | 65 | polyamine character | | slightly tacky | 30 |
| 19 | 21 | good | slightly tacky | | 67 | polyamine character | | tacky | 30 |
| 20 | 25 | good | slightly tacky | | 72 | polyamine character | | tacky | 30 |

EXAMPLE 27

230 g of a polyethylene polyamine mixture, designated as "pentaethylene hexamine", are heated at 150° C. with 211 g (1 mol) of bis-(dimethylaminomethyl)-phenol. After one hour, 88 g (98 percent of theory) of dimethylamine have split off. 85 g of 1-amino-3-aminomethyl-3,5,5-trimethyl-cyclohexane are added and a product having a viscosity of 0.2 Pa. s/25° C. is obtained.

Following Table I compares the phenol content, pot life, and hardness of several epoxy resin samples hard-

What is claimed is:

1. The method of curing an epoxy resin to form a crosslinked duroplast product, which method comprises reacting an epoxy compound having an average of more than one epoxy group per molecule with a liquid amine compound having an average of more than two active amine hydrogen atoms per molecule, which liquid amine compound is prepared by the reaction, with amine exchange and liberation of secondary amine, of a Mannich base and an amount of a member selected from the group consisting of aminoamides, aminoimidazolines, aminoamides containing an imidazoline group, and polyamines such that the amine compound reaction product has an average of more than two active hydrogen atoms per molecule, said Mannich base being prepared by reacting formaldehyde, a monophenol or polyphenol, and a secondary amine.

2. A method as in claim 1 wherein said epoxy compound and said liquid amine compound are reacted at a temperature between room temperature and about 5° C.

3. A method as in claim 1 wherein said aminoamides, aminoimidazolines, and aminoamides containing an imidazoline group are prepared by condensing an acid component comprising an acid selected from the group consisting of
- (a1) monocarboxylic acids having 2 to 22 carbon atoms;
- (a2) the polymerization products of unsaturated higher fatty acids having 16 to 22 carbon atoms;
- (a3) copolymers of unsaturated fatty acids having 16 to 22 carbon atoms with aromatic vinyl compounds,
- (a4) adducts of unsaturated fatty acids with unsaturated lower monocarboxylic and dicarboxylic acids;
- (a5) acids prepared by reacting unsaturated fatty acids with CO and water;
- (a6) epoxidized unsaturated higher fatty acids;
- (a7) aliphatic, hydroaromatic, araliphatic and aromatic dicarboxylic and polycarboxylic acids having 6 to 36 carbon atoms;
- (a8) acids which are prepared by the addition of phenols to unsaturated monocarboxylic or dicarboxylic acids; and
- (a9) amino acids or lactams,
    with an amine component comprising a polyamine selected from the group consisting of
- (aa1) polyethylene polyamines;
- (aa2) polypropylene polyamines;
- (aa3) aliphatic polyamines;
- (aa4) cycloaliphatic polyamines;
- (aa5) heterocyclic polyamines; and
- (aa6) polyether amines,
    said acid component and amine component being reacted in such amounts that the ratio of amino groups to carboxyl groups in the reaction mixture is greater than one.

4. A method as in claim 3 wherein said epoxy compound and said liquid amine compound are reacted at a temperature between room temperature and about 5° C.

5. A method as in claim 1 wherein said polyamines are selected from the group consisting of
- (a10) polyethylene polyamines;
- (a11) polypropylene polyamines and polyamines obtained by the cyanethylation of polyamines followed by hydrogenation;
- (a12) aliphatic polyamines;
- (a13) cycloaliphatic polyamines;
- (a14) heterocyclic polyamines;
- (a15) polyetheramines; and
- (a16) aromatic amines.

6. A method as in claim 5 wherein said epoxy compound and said liquid amine compound are reacted at a temperature between room temperature and about 5° C.

7. A method as in claim 1 wherein said liquid amine compound contains at least one tertiary amino group.

8. A method as in claim 7 wherein said epoxy compound and said liquid amine compound are reacted at a temperature between room temperature and about 5° C.

9. A method as in claim 1 wherein said Mannich base is prepared from a phenol selected from the group consisting of phenol and 4,4'-dihydroxydiphenylpropane-2,2.

10. A method as in claim 9 wherein said epoxy compound and said liquid amine compound are reacted at a temperature between room temperature and about 5° C.

11. A method as in claim 1 wherein said epoxy compound and said liquid amine compound are reacted together with a conventional amine hardening agent for epoxy compounds.

12. A cured epoxy resin prepared by the method of claim 1.

13. A cured epoxy resin prepared by the method of claim 3.

14. A cured epoxy resin prepared by the method of claim 5.

15. A cured epoxy resin prepared by the method of claim 7.

16. A cured epoxy resin prepared by the method of claim 9.

17. A cured epoxy resin prepared by the method of claim 11.

* * * * *